United States Patent [19]

Wood et al.

[11] Patent Number: 5,282,875

[45] Date of Patent: Feb. 1, 1994

[54] HIGH DENSITY SOL-GEL ALUMINA-BASED ABRASIVE VITREOUS BONDED GRINDING WHEEL

[75] Inventors: William P. Wood, Golden Valley, Minn.; Soo C. Yoon, Cincinnati, Ohio

[73] Assignees: Cincinnati Milacron Inc., Cincinnati, Ohio; Minnesota Mining and Manufacturing Company, St. Paul, Minn.

[21] Appl. No.: 44,914

[22] Filed: Apr. 8, 1993

Related U.S. Application Data

[63] Continuation of Ser. No. 853,644, Mar. 18, 1992, abandoned.

[51] Int. Cl.$^5$ .................................................. C09K 3/14
[52] U.S. Cl. .......................................... 51/298; 51/308; 51/309
[58] Field of Search ............................. 51/298, 308, 309

[56] References Cited

U.S. PATENT DOCUMENTS

| | | | |
|---|---|---|---|
| 3,909,991 | 10/1975 | Coes | 51/309 |
| 4,311,489 | 1/1982 | Kressner | 51/298 |
| 4,314,827 | 2/1982 | Leitheiser et al. | 51/298 |
| 4,518,397 | 5/1985 | Leitheiser et al. | 51/293 |
| 4,543,107 | 9/1985 | Rue | 51/309 |
| 4,574,003 | 3/1986 | Gerk | 51/309 |
| 4,623,364 | 11/1986 | Cottringer et al. | 51/309 |
| 4,741,743 | 5/1988 | Narayanan et al. | 51/309 |
| 4,744,802 | 5/1988 | Schwabel | 51/309 |
| 4,770,671 | 9/1988 | Monroe et al. | 51/293 |
| 4,800,685 | 1/1989 | Haynes | 51/281 |
| 4,881,951 | 11/1989 | Wood et al. | 51/309 |
| 4,883,501 | 11/1989 | Haynes, Jr. | 51/298 |
| 4,988,370 | 1/1991 | Haynes, Jr. | 51/309 |
| 4,997,461 | 3/1991 | Markhoff-Matherry et al. | 51/298 |
| 5,007,943 | 4/1991 | Kelly et al. | 51/309 |
| 5,037,452 | 8/1991 | Gary et al. | 51/293 |
| 5,053,369 | 10/1991 | Winkler et al. | 501/152 |
| 5,094,672 | 3/1992 | Giles, Jr. et al. | 51/298 |
| 5,104,424 | 4/1992 | Hickory et al. | 51/309 |
| 5,110,322 | 5/1992 | Narayanan et al. | 51/309 |

FOREIGN PATENT DOCUMENTS 0293163 11/1988 European Pat. Off. .

OTHER PUBLICATIONS

"Use of Sintered Ceramic Aluminum Oxides in Vitrified Bonded Wheel", *Society of Manufacturing Engineers*, EM90-360 1990.

"In Situ Whisker Growth in Sol Gel Abrasive Grain", W. P. Wood, Sep., 1990, *The American Ceramic Bulletin Society*.

*Primary Examiner*—Mark L. Bell
*Assistant Examiner*—Willie J. Thompson
*Attorney, Agent, or Firm*—Gary L. Griswold; Walter N. Kirn; Gregory D. Allen

[57] ABSTRACT

A vitreous bonded abrasive article such as a grinding wheel is provided comprising high density sol-gel alumina-based abrasive grains comprised of alpha alumina and a vitreous bond which binds together the abrasive grains. The grinding wheel of the invention exhibits enhanced G-ratio grinding performance over comparable wheels containing sol-gel alumina-based abrasive grain having a density less than 3.85 grams per cubic centimeter.

12 Claims, No Drawings

HIGH DENSITY SOL-GEL ALUMINA-BASED ABRASIVE VITREOUS BONDED GRINDING WHEEL

This is a continuation of application Ser. No. 07/853,644 filed Mar. 18, 1992, now abandoned.

FIELD OF INVENTION

This invention pertains to vitreous bonded sintered sol-gel alumina-based ceramic abrasive grain articles and more particularly to vitreous bonded high density sintered sol-gel alumina-based ceramic abrasive grain articles, more especially grinding wheels, having high grinding performance.

BACKGROUND OF THE INVENTION

Vitreous bonded alumina abrasive grain grinding wheels have enjoyed large popularity and use for many years in grinding operations for a large variety of metal workpieces, particularly iron and steel workpieces. The principle alumina abrasive grain used in such grinding wheels has been and continues to be fused alumina abrasive grain. Such past and continued use of fused alumina grain has in large measure been based on economic considerations, even though less than desirable grinding performance was often achieved. Fused alumina grain is low cost. This less than desirable performance is often manifested not only in the reduced quality of the finished parts, but also in other considerations such as higher power consumption, heat generation, friction, reduced production rates, higher costs and low G-ratio.

The last factor (i.e., G-ratio) is the ratio of the volume of metal removed from the workpiece to the volume of wheel lost during the grinding operation. Thus it is the volume of metal removed per unit volume of wheel wear. A low G-ratio indicates a small amount of metal removed from the workpiece per unit volume of wear or loss of the grinding wheel and therefore indicates very little grinding is taking place and/or high wear of the grinding wheel. The high wear of the grinding wheel results in a short useful life of the wheel, increased wheel usage and increased wheel cost in the grinding operation. A high G-ratio shows a large amount of metal removed from the workpiece per unit volume of wheel wear or loss. Such high G-ratio indicates longer useful wheel life, lower wheel usage, greater cost effectiveness, higher production rates and more efficient grinding. Reduced power consumption, lower friction and reduced heat often accompany a high G-ratio grinding operation. As the G-ratio increases there often can be accompanying increases in wheel speed, infeed rates and workpiece rotation speed. These increases lead to higher production rates. Thus, higher G-ratio is desirable and sought after in the development and improvement of grinding wheels, especially in wheels employing costly abrasive grain (e.g., super abrasive grain). Increasing the G-ratio of grinding wheels containing more expensive grain makes such wheels more cost competitive with lower G-ratio wheels made with low cost abrasive grain and increases their cost effectiveness in precision, critical and difficult grinding operations (e.g., grinding tool steel and exotic alloys).

More recently an improved alumina abrasive grain was developed using a sol-gel and sintering process rather than the fusion process for producing alumina abrasive grains. Such newer abrasive grains proved to be more costly than the fused alumina grain. However, grinding wheels made with the sintered sol-gel alumina abrasive exhibited improved grinding performance over wheels made with fused alumina grain. This improved performance was obtained at a higher grinding wheel cost, particularly when such grain is used in vitreous bonded grinding wheels. Thus, sintered sol-gel alumina abrasive grain have not achieved the popularity and wide spread use found for fused alumina abrasive grains. Increasing the grinding performance, especially the G-ratio, of grinding wheels produced with sol-gel alumina abrasive grain, particularly vitreous bonded grinding wheels made with such abrasive grain, would make them highly competitive with wheels produced with fused alumina abrasive grain in a wide range of grinding applications.

The sintered sol-gel alumina abrasive grains can be produced by a process comprising the steps of preparing a dispersion of an alumina monohydrate to which a modifier may be added, gelling the dispersion, drying the gelled dispersion, crushing the dried gelled dispersion to form particles, calcining the particles, and firing the particles to form abrasive grains. Various adaptations and modification of this basic process have been developed and disclosed since the process was first discovered and disclosed to the art. The firing step is carried out to sinter the grains at temperatures below the fusion temperature of aluminum oxide. The sol-gel process of making alumina abrasive grains is more fully described in U.S. Pat. No. 4,314,827 to Leitheiser et al, which disclosure is incorporated herein by reference.

The first sol-gel alumina abrasive grains were disclosed in U.S. Pat. Nos. 4,314,827 and 4,518,397 to Leitheiser et al. These patents teach a non-fused abrasive grain comprising alpha alumina and at least one modifier selected from the group consisting of oxides of zirconium, hafnium, cobalt, nickel, zinc, and magnesium, and may include secondary modifiers such as samaria, titania and ceria.

In U.S. Pat. No. 4,623,364 to Cottringer et al disclosure is made of the addition of an alpha alumina seed material to the non-alpha alumina dispersion, in the sol-gel process, to enhance the transformation to alpha alumina during sintering.

Disclosure is made in U.S. Pat. No. 4,744,802 to Schwabel of a sol-gel process wherein iron oxide or an iron oxide precursor is added to the alumina dispersion for producing a durable alpha alumina abrasive grain.

A ceramic abrasive grain comprising alpha alumina and at least about 0.5% yttria modifier is disclosed in U.S. Pat. No. 4,770,671 to Monroe et al. The abrasive grain is especially efficient for abrading stainless steel and exotic alloys.

The impregnation of a metal oxide modifier into a porous sol-gel process alumina body is taught in European Patent Application, Number EP 293,163A, published November 1988, in a process comprising preparing a dispersion of alpha alumina monohydrate, gelling the dispersion, drying the gelled dispersion, crushing the dried dispersion to form particles, calcining the particles, impregnating the particles with a dispersion of a precursor of the metal oxide, drying the impregnated particles, calcining the dried particles and firing the dried particles to form abrasive grains. The modifier can be an oxide of magnesium, zirconium, hafnium, nickel, cobalt, zinc, titanium, yttrium, or a rare earth metal.

Sol-gel process ceramic abrasive grain comprising alpha alumina and at least 0.5% of a rare earth metal oxide is taught in U.S. Pat. No. 4,881,951 to Wood et al. The rare earth metal may be selected from praseodymium, samarium, ytterbium, neodymium, lanthanum, gadolinium, cerium, dysprosium, erbium and mixtures thereof. Impregnation of the rare earth modifier as in EP 293,163A into the unfired alumina particle is also taught.

The modification of sol-gel alumina abrasive grain with from 0.01 to 2% ceria is taught in U.S. Pat. No. 5,053,369.

There is disclosed in The Society of Manufacturing Engineers Paper EM 90-360, entitled "Use of Sintered Ceramic Aluminum Oxides in Vitrified Bonded Wheels", published Sep. 12, 1990, the grinding performance of vitrified bonded abrasive wheels employing ceramic alumina-based abrasive grains.

The use of sol-gel abrasive grain in bonded abrasive articles is known in the art. However, no recognition or significance is given or suggested in the art that the G-ratio of a vitreous bonded sol-gel alumina abrasive grain grinding wheel or other bonded abrasive article is particularly and significantly enhanced by the presence therein of sol-gel alumina abrasive grain having a high density, particularly a density of at least 3.85 grams per cubic centimeter (g/cc). It is known that a given abrasive grain can be produced with a range of densities by varying the pore content and composition of the grain. The greater the pore content the lower the density and conversely the lower the pore content the higher the density without composition variation. At zero pore content the maximum density is typically achieved. This maximum density can be the theoretical density of the grain. As used in this disclosure the phrases sol-gel alumina abrasive grain and sintered sol-gel alumina abrasive grain shall be used interchangeably and shall mean alpha-alumina-based abrasive grain produced by the sol-gel process.

Alumina-based abrasive grains produced by the sol-gel process are to be distinguished from alumina abrasive grains made by conventional sintering of particulate alpha-alumina and by fusion processes. The sol-gel process includes the preparation of an aqueous dispersion of alumina monohydrate to which modifiers may be added, gelling the dispersion, drying of the gel, crushing the dried gel to produce particles, calcining the dried particles and firing the calcined particles. These process steps are not included in the production of conventional sintered or fused alumina abrasive grain. Owing to the differences in the processes for producing sol-gel, sintered and fused alumina abrasive grains there are found differences in grain structure, grain properties and grain performance in grinding wheels and other abrasive articles, particularly vitreous bonded grinding wheels and other bonded abrasive articles (e.g., honing stones). While sol-gel abrasive grains have been recognized in the art to provide superior grinding performance over fused alumina abrasive grains in vitreous bonded grinding wheels, there has been no recognition that high density sol-gel alumina grains would produce an unexpectedly high performance improvement in vitreous bonded abrasive products.

SUMMARY OF THE INVENTION

The present invention provides a Vitreous bonded abrasive article such as a grinding wheel comprised of high density sol-gel alumina-based abrasive grains which exhibits improved G-ratio grinding performance.

Specifically, the invention provides a vitreous bonded abrasive article having an enhanced G-ratio grinding performance comprising a vitreous bond phase which binds together abrasive grains and high density sol-gel alumina-based abrasive grains comprising alpha alumina and modifier.

More specifically, the invention provides a vitreous bonded abrasive article having enhanced G-ratio grinding performance, comprising abrasive grains and a vitreous bond phase binding together said grains wherein the abrasive grains comprise at least sol-gel alumina-based abrasive grains comprising alumina and at least 0.01% by weight of said alumina-based abrasive grain of a modifier selected from the group consisting of 1) oxides of zirconium, hafnium, cobalt, titanium, nickel, iron, zinc, magnesium, yttrium, praseodymium, samarium, ytterbium, neodymium, lanthanum, gadolinium, cerium, dysprosium, erbium and combinations thereof, and 2) a product of the reaction between alumina and at least one of said oxides, said sol-gel alumina abrasive having a density of at least 3.85 grams per cubic centimeter.

The high density sol-gel alumina-based abrasive grain preferably comprises on a weight basis based on 100 parts of abrasive grain:
(a) 0.1 to 10 (preferably 1-3) parts modifier selected from the group consisting of
   (i) magnesia,
   (ii) nickel oxide,
   (iii) zinc oxide,
   (iv) cobalt oxide,
   (v) iron oxide,
   (vi) titania, and
   (vii) mixtures of (i) - (vi);
(b) 0 to 10 (preferably 1-3) parts yttria modifier;
(c) 0 to 10 (preferably 1-3) parts modifier comprised of an oxide of rare earth metal selected from the group consisting of
   (i) praseodymium,
   (ii) samarium,
   (iii) ytterbium,
   (iv) neodymium,
   (v) lanthanum,
   (vi) gadolinium,
   (vii) cerium,
   (viii) dysprosium,
   (ix) erbium, and
   (x) mixtures of (i)–(ix);
(d) the balance of the 100 parts is alumina, and provided the minimum amount of (b), (c) or a combination of (b) and (c) is at least 0.1 part.

As later explained, certain of the modifiers will react to form an oxide reaction product of aluminum and modifier metal. Rather than referring to the particular reaction product of alumina and modifier oxide, the composition of the grains will be characterized as if these components were unreacted but it will be understood that they are in the reacted form, if such reactions are possible and take place.

As used herein, the term "high density" in reference to the sol-gel alumina-based abrasive grain shall mean a density of at least 3.85 g/cc preferably of at least 3.86 g/cc, most preferably of at least 3.89 g/cc. The density of the sol-gel alumina-based abrasive is the density which is measured by use of a helium gas pycnometer as commercially available from Micromeritics of Norcross, GA under the trade designation "AccuPyc 1330".

The term "improved G-ratio" or "enhanced G-ratio" shall mean a G-ratio which is at least 20% (preferably at least 50%) higher than the G-ratio observed when testing under the same conditions a control abrasive wheel. Such a control abrasive wheel will have the same size, shape, bond phase, abrasive grain grade and sol-gel alumina-based abrasive grain loading as the test wheel of the invention and be tested under the same test conditions. The only difference is that a control sol-gel alumina-based abrasive grain having a density on the order of 3.82 g/cc is used in the control abrasive wheel instead of the high density sol-gel alumina-based abrasive grain. Such a control sol-gel alumina-based abrasive grain is the iron oxide-seeded (2% by weight as $Fe_2O_3$), 4.5% by weight magnesia-modified sol-gel alumina-based abrasive grain which is commercially available from the 3M Company under the trade designation "Cubitron".

DESCRIPTION OF THE INVENTION

The high density sol-gel alumina-based abrasive grains of the invention are made in accordance with the teachings of U.S. Pat. Nos. 4,314,827, 4,770,671 and 4,881,951, incorporated herein by reference, except they are optimized in accordance with the present invention to provide higher density. Higher density is provided by appropriate selection of ingredients as indicated above and by employing a sintering temperature which is at least about 1400° C., preferably at least about 1410° C., most preferably about 1420° C. The firing temperature should not exceed the fusion temperature of alpha-alumina.

In a preferred practice of the abrasive article of this invention the high density sol-gel alumina-based abrasive grains comprise by weight on an oxide basis comprising 88 to 99 parts alumina, 0.01 to 6 parts magnesia, 0.01 to 10 parts yttria, 0.01 to 6 parts lanthanum oxide and 0.01 to 6 parts neodymium oxide. A more preferred practice of the abrasive article of this invention is that the high density sol-gel alumina-based abrasive grain comprises, by weight on an oxide basis, comprises 91 to 99 parts alumina, 0.1 to 3 parts magnesia, 0.1 to 3 parts lanthanum oxide and 0.1 to 3 parts neodymium oxide.

On firing, magnesium, nickel, zinc, iron and cobalt oxides will separately, or collectively if used in combination, react with alumina to form a spinel. If one or more rare earth metal oxides are present with these metal oxide modifiers, such rare earth metal oxide(s) may react with spinel and/or alumina.

The aforementioned rare earth metal oxide present in the high density sol-gel alumina-based abrasive grain will be usually reacted with aluminum oxide to form a rare earth metal-aluminum oxide reaction product. The oxide of the reaction product of dysprosium, yttrium and gadolinium with aluminum will generally be a garnet, while the oxide of the reaction product of praseodymium, ytterbium, erbium and samarium with aluminum will generally be a perovskite which may include garnet. On the other hand, the reaction of lanthanum and aluminum causes conversion of some of the alumina to its beta form but may also form a perovskite.

Certain reactions of rare earth metal oxides, divalent metal oxides and aluminum oxide produce hexagonal rare earth aluminates and thereby produce abrasive grains having an alpha alumina phase and a hexagonal aluminate phase. The hexagonal aluminate phase may coexist, of course, with other phases in the alpha alumina phase, depending upon the starting materials. For example, the alpha alumina phase may include a spinel phase and a hexagonal rare earth alumina phase. Other phases such as garnet, beta alumina and perovskite may also be present depending upon the starting materials.

Seeded and non-seeded high density sol-gel alumina-based abrasive grains may be employed in accordance with this invention; however, the non-seeded abrasive grains are preferred. Seeding may be accomplished as described in U.S. Pat. No. 4,744,802, incorporated herein by reference. In cases where seeding is accomplished with iron oxide and iron oxide is employed as a modifier, the modifier source is a solution of an iron salt such as iron nitrate and the iron oxide seed source is $Fe_2O_3$ or a particulate material which converts on heating to $Fe_2O_3$ such as goethite.

The high density sol-gel alumina-based abrasive grains which are useful in the abrasive articles of this invention may be made by a method that comprises the steps of a) preparing a uniform aqueous dispersion of alpha alumina hydrate such as the monohydrate, b) gelling the dispersion usually by adding the modifier or its precursor, c) drying the gelled dispersion, d) crushing the dried dispersion to form particles, e) preferably calcining the dried particles, and f) firing the particles at a sintering temperature of at least 1400° C. In this method the first step is to prepare a dispersion of alpha alumina hydrate, preferably the monohydrate. The dispersion typically comprises from about 2 to about 60 weight percent of alumina monohydrate (boehmite), although other hydrates can be used. The dispersion will contain at least 10% by weight water, preferably 30 to 80% by weight water. The boehmite can be prepared by various techniques well known in the art or can be acquired commercially from several suppliers. Examples of commercially available sources of boehmite include that available under the trade name Disperal ® from Condea Chemie, GMBH and that available under the trade name Dispal from Vista Chemical Company. These aluminum oxide monohydrates are in the alpha form, are relatively pure (including relatively little, if any hydrate phase other than monohydrate), and have a high surface area. Gelation of the dispersion may be accomplished by addition of the modifying agent or its precursor. A peptizing agent is usually added to the dispersion to produce a more stable hydrosol or colloidal dispersion. The peptizing agent is typically a monoprotic acid or an acid compound examples of which include acetic, hydrochloric, formic and nitric acids.

The dispersion will contain at least one precursor of a metal oxide modifier which can be added to enhance some desirable property of the finished product or increase the effectiveness of the sintering step. These modifiers are typically in the form of soluble salts, typically water soluble, and can be a precursor of the oxides of magnesium, zinc, cobalt, nickel, iron, zirconium, hafnium, chromium, yttrium, praseodymium, samarium, ytterbium, neodymium, lanthanum, gadolinium, cerium, dysprosium, erbium, titanium and mixtures thereof. The exact proportions of these components are selected as indicated above to provide a high density abrasive grain. For example, if the abrasive grain will be employed in stainless steel grinding, yttria and rare earth oxides are preferred modifiers. These modifiers are further described in U.S. Pat. Nos. 518,397; 4,770,671 and 4,881,951.

In most instances, the dispersion will gel prior to the drying step. Gelling typically occurs with the addition of the modifier salt or modifier precursor. The pH of the dispersion is important in determining how fast the dispersion will gel, lower pH dispersions gelling faster. Typically, the pH is in the range of about 1.5 to 4.

The dispersion may be dried by conventional means and may be accomplished in steps. In the drying step a plastic mass may first be produced by partial drying of the dispersion. Once sufficient water has been removed from the dispersion the partially dried plastic mass may be shaped by any convenient method such as pressing, molding or extrusion and then carefully dried to produce the desired shape (e.g., rod, pyramid, diamond, cone etc.). Irregularly-shaped abrasive grains are conveniently formed by simply depositing the dispersion in any convenient size drying vessel, such as one in the shape of a cake pan, and drying, usually at a temperature below the frothing temperature of the dispersion. Drying may also be accomplished by simply air drying or by using any of several other dewatering methods known in the art. Drying can also be accomplished in a forced air oven at a temperature from about 50° to about 200° C., preferably 100° to 150° C.

The dried porous solid is then crushed to produce particles. The crushing step can be done by any suitable means such as a hammer or ball mill. Any method for comminuting the solid can be used and the term "crushing" is used to include all such methods. The crushing step is optional, if the particles are already in the proper grade.

During calcining essentially all the volatiles are removed and various components present in the dispersion are transformed into metal oxides. A temperature between about 400° and about 800° C. is used in the calcining step and the particles are held in this temperature range until the free water and over 90 percent of any bound volatiles are removed. It is preferred to calcine the particles.

Firing of the calcined particles sinters the grains. This sintering for a non-seeded grain is usually accomplished by heating the particles to a temperature between about 1400° and about 1650° C. under non-reducing, preferably oxidizing, conditions and holding the particles at this temperature until substantially all of the metal oxide precursor either reacts with the alpha alumina or forms a metal oxide. Sintering conditions for spinel-modified seeded grains may usually be at lower temperatures (.e.g, about 1350°) for longer periods of time. Higher sintering temperatures (e.g., above 1400° C.) are preferred for seeded grains containing other modifiers such as rare earth oxides. During the sintering of the particles the alumina will be transformed to alpha alumina and/or the alumina will form a reaction product with the metal oxide precursors or metal oxide modifiers. The length of time to which the calcined particles must be exposed to the sintering temperature to achieve this level of conversion will depend upon various factors but usually will be accomplished within seconds, to about 60 minutes, usually less than 30 minutes. In some instances, it is preferred that the particles be agitated during sintering. The firing steps are more fully described in U.S. Pat. No. 4,314,827.

The high density sol-gel alumina-based abrasive grains usable in the practice of this invention may also be made by a process that comprises the steps of a) preparing a dispersion of alumina monohydrate, b) gelling the dispersion, c) drying the dispersion to form a porous solid, d) crushing the dried porous solid to produce particles, e) calcining the dried particles, f) preparing a mixture of a metal oxide modifier or a precursor of the metal oxide modifier in a liquid vehicle, g) impregnating the mixture of the metal oxide modifier or its precursor of step (f) into the calcined particles, h) drying the impregnated particles, and i) firing the dried impregnated particles at a sintering temperature. It is preferred to make the high density sol-gel alumina-based abrasive grain according to this process because it typically results in a denser abrasive grain. In this process the first four steps are similar to the first four steps of the previously described sol-gel process except that the dispersion does not have to contain at least one modifier, metal oxide modifier or metal oxide modifier precursor and the crushed particles are calcined (i.e., calcining is not optional).

In preparing a mixture of a metal oxide modifier or the precursor of the metal oxide modifier, the liquid vehicle in step (f) is preferably water but it can also be an organic solvent. The metal oxide modifier is typically present as a salt of the metal, for example, a nitrate or acetate salt which usually dissolves in the liquid. The mixture can have a salt concentration of between 1 and 40% solids on an oxide basis.

Impregnating the liquid mixture of the metal oxide modifier or precursor thereof into the calcined particles can be accomplished by mixing the calcined particles with the impregnating liquid. The impregnating liquid mixture usually penetrates into the porous particles by capillary action. When the impregnating liquid mixture has a high viscosity it is preferred to employ a vacuum during the mixing operation. Sufficient impregnating liquid mixture is added to the calcined particles to provide at least 0.5% by weight, preferable 1 to about 30% by weight, metal oxide modifier as calculated on a fired solids basis. Such concentration will be understood to be an average concentration throughout the fired impregnated particles (i.e., abrasive grain) even though the concentrations may be higher near the surface of each abrasive particle than in the interior. Multiple impregnation steps with the same or different liquid mixtures may be used with each impregnation followed by drying and calcining steps. The liquid mixtures may contain different concentrations of the same salt, different salts or a mixture of salts in the multiple impregnation procedure.

Drying and calcining of the impregnated particles removes bound volatile materials. Drying is usually accomplished at a temperature within the range of about 50° to 200° C. Calcining is usually accomplished at temperatures between about 400° to about 800° C. Sintering of the impregnated particles can be accomplished as described for the previous sol-gel process. Additional disclosure of the impregnation process can be found in European Patent Application EP 293,163, published Nov, 30, 1988.

There may be employed in the practice of this invention high density sol-gel alumina-based abrasive grains having a surface coating or treatment, which have been applied to conventional abrasive grains, to improve adhesion of the grain to the vitreous binding phase of the abrasive article.

The high density sol-gel alumina-based abrasive grains can also be combined with abrasive agglomerates or utilized in abrasive agglomerates to make abrasive products according to the invention. Examples of products which contain abrasive agglomerates are described in U.S. Pat. No. 4,311,489. However, in such combinations at least 15% by weight, and preferably 50 to 100% by weight, of the grains of the abrasive product should be the high density sol-gel alumina-based abrasive grains.

Various other abrasive grains may be employed in combination with the high density sol-gel alumina-based abrasive grain in the practice of this invention, including but not limited to fused alumina, other sol-gel abrasive grains such as sol-gel aluminum nitride/aluminum oxynitride, conventionally sintered alumina-based abrasive materials, silicon carbide, cubic boron nitride and diamond abrasive grains. Various combinations of abrasive grains different in composition and/or size may also be used. Mixtures of abrasive grains of the same composition but different sizes and of different compositions and same size can also be employed in the abrasive article of this invention. The high density sol-gel alumina-based abrasive grain may be all of the same size and composition or may be a mixture of different high density sol-gel alumina-based abrasive grain compositions and/or sizes. Abrasive grain of sizes well known in the art can be employed in the practice of this invention.

The vitreous bond phase which binds together the abrasive grain in accordance with this invention can be of any suitable composition which is well known in the art. The vitreous bond phase, also known in the art as a "vitreous bond", "ceramic bond" or "glass bond", may be produced from a combination or mixture of metal oxides and silicates which upon being heated to a high temperature react to form an integral vitreous bond phase. Such a vitreous base phase may also be produced from a frit, which when heated to a high temperature melts and/or fuses to form an integral vitreous matrix phase. Frits, their sources and compositions are well known in the art.

Abrasive articles are typically prepared by forming a green structure comprised of abrasive grain, the vitreous bond precursor, and a temporary binder. The green structure is then fired. The vitreous bond phase is usually produced in the firing step of the process for producing the abrasive article of this invention. Typical firing temperatures are in the range of from 540° to 1370° C. (1000° F. to 2500° F.). It should be understood that the temperature selected for the firing step and the composition of the vitreous bond phase must be chosen so as to not have a detrimental effect on the physical properties and/or composition of the high density sol-gel alumina-based abrasive grain and any other abrasive grain contained in the abrasive article.

A preferred vitreous bond has an oxide-based mole % composition of $SiO_2$ 63 28; $TiO_2$ 0.32; $Al_2O_3$ 10.99; $B_2O_3$ 5.11; $Fe_2O_3$ 0.13; $K_2O$ 3.81; $Na_2O$ 4.20; $Li_2O$ 4.98; $CaO$ 3.88; $MgO$ 3.04 and $BaO$ 0.26. Firing of these ingredients is typically accomplished by raising the temperature from room temperature to 1149° C. (2100° F.) over a prolonged period of time (e.g., about 25–26 hours), holding at the maximum temperature, e.g., for several hours, and then cooling the fired article to room temperature over an extended period of time, e.g., 25–30 hours.

It is known in the art to use various additives in the making of vitreous bonded abrasive articles both to assist in the making of the abrasive article and/or improve the performance of such articles. Such conventional additives which may also be used in the practice of this invention include but are not limited to lubricants, fillers, temporary binders and processing aids. Examples of lubricants include, graphite, sulfur, polytetrafluoroethylene and molybdenum disulfide. Concentrations of the additives as are well known in the art may be employed for the intended purpose of the additive. It is however to be observed that the additives have little or no adverse effect on the high density sol-gel alumina-based abrasive grain or other abrasive grain employed in the practice of this invention.

Procedures and conditions well known in the art for producing vitreous bonded abrasive articles (e.g., grinding wheels) and especially procedures and conditions for producing vitreous bonded high density sol-gel alumina-based abrasive articles may be used to make the abrasive article of this invention. These procedures may employ conventional and well known equipment in the art.

It has been unexpectedly discovered that at comparable sol-gel alumina-based abrasive grain loading, grinding wheel composition and structure and grinding conditions, the G-ratio grinding performance of a vitreous bonded sol-gel alumina-based abrasive grain grinding wheel is enhanced as the grain density of the sol-gel alumina-based abrasive grain is increased to 3.85 grams per cubic centimeter and higher. While the density of sol-gel alumina-based abrasive grain may be caused to increase over that of a sol-gel alumina-based abrasive grain of comparable abrasive grain composition by appropriate process conditions as described above, it is recognized that the density of the sol-gel alumina-based abrasive grain may also be increased by changes in the composition of the grain itself. Further, it is recognized that such changes in the sol-gel alumina-based abrasive grain composition leading to increased grain density may produce increased G-ratio grinding performance for a vitreous bonded grinding wheel containing such grain of increased density over an otherwise comparable vitreous bonded grinding wheel containing a lower density sol-gel alumina-based abrasive grain. These recognitions are therefore embraced by the scope and intent of this invention.

This invention will now be further described in the following nonlimiting examples wherein, unless otherwise specified, the amounts of material are by weight.

EXAMPLES

High density sol-gel alumina-based abrasive grains were made according to one of the two procedures detailed below. The abrasive grain compositions set forth below are calculated amounts based on the weight of starting materials to arrive at an oxide weight basis. The abrasive grain density was measured with a helium gas pycnometer commercially available from Micromeritics, Norcross, GA under the trade designation "AccuPyc 1330".

General Procedure I for Making the Abrasive Grains

The following were dispersed together using a high shear mixer: 69.8 parts of approximately 50° C. deionized water, 1.67 part of reagent grade concentrated nitric acid and 28.5 parts alpha aluminum oxide monohydrate powder available under the trade designation Disperal. The resulting sol was dried over a 24-hour period starting at about 100° C. and increasing the temperature to about 180° C. After drying, there resulted a friable solid that was then crushed and screened. The screened particles passed through a screen containing 1 mm openings but were retained on a screen containing 0.125 mm openings. The screened particles were then fed into the feed end of a calciner to substantially remove the bound volatiles. The calciner had a hot zone feed end temperature of 350° C. and exit end temperature of 800° C.

Into a continuous mixer was placed the calcined particles with the modifier precursor as a metal nitrate solution. The amount and concentration of the modifier precursor solution was selected so that the final composition given in each of the following examples was achieved. The continuous mixer was rotated to cause the modifier precursor solution to be impregnated into the calcined particles by capillary action. After this impregnation step, the resulting particles were then fed into a rotary calciner as described previously. The resulting grains exited from the calciner and were fed into a 1400° C. kiln which was a 8.9 cm diameter 1.32 meter long silicon carbide tube inclined at 4.4 degrees with respect to the horizontal and having a 76 cm hot zone, rotating at 10.5 RPM, to provide a residence time therein of about 5 minutes. The product exited the kiln into room temperature where it was collected in a metal container and allowed to cool to room temperature.

General procedure II for Making the Abrasive Grains

The abrasive grains according to General Procedure II were made essentially in the same manner as General Procedure I, except that a different kiln and conditions were utilized to final fire the abrasive grains. The kiln was a rotary kiln in which the abrasive grain was heated from room temperature to 400° C. in one minute. The kiln included internal bed disrupters which, during sintering, caused the abrasive grains to be agitated.

Abrasive Grain (AG) No. 1–13 and Comparative A

Abrasive Grain Nos. 1–4 and 7–13 were made according to the General Procedure I and Abrasive Grain Nos. 5 and 6 and Comparative A were made according to General Procedure II. The calculated chemical composition of the abrasive grains can be found in the Tables below. The abrasive grain density was measured with a helium gas pyconometer commercially available from Micromeritics, Norcross, GA under the trade designation AccuPyc 1330.

Vitreous Bond A

Bond A has an oxide based mole % composition of $SiO_2$ 63.28; $TiO_2$ 0.32; $Al_2O_3$ 10.99; $B_2O_3$ 5.11; $Fe_2O_3$ 0.13; $K_2O$ 3.81; $Na_2O$ 4.20; $Li_2O$ 4.98; $CaO$ 3.88; $MgO$ 3.04 and $BaO$ 0.26.

VItreous Bond B

Bond B has an oxide based mole % composition of $SiO_2$ 64.29; $TiO_2$ 0.62; $Al_2O_3$ 7.55; $Fe_2O_3$ 0.14; $B_2O_3$ 3.91; $K_2O$ 3.49; $Na_2O$ 3.22; $CaO$ 3.63 and $MgO$ 3.15.

Temporary Binder Solution

The temporary binder solution (designated "3029 UF Resin") was 65% solids urea formaldehyde resin and 35% water.

The components of the formulations in the grinding wheel examples below were combined in accordance with the percentages hereafter listed. A designated abrasive grain (AG), the 3029 UF Resin and ethylene glycol were blended together until a uniform coating of the abrasive grain was achieved. To the resulting mixture was added a combination of bond, dextrine and starch and mixing was continued until a uniform blend was obtained. The resulting composition was then screened to remove undesirable lumps and a predetermined amount of the screened mix was placed in a steel mold of the shape and approximate size of the grinding wheel to be produced. After uniformly distributing the mix in the mold, it was cold pressed to compact the mix to the shape and approximate size of the desired wheel. The compacted blend (i.e., green wheel) was then removed from the mold and dried while heating from room temperature to 135° C. (275° F.) over a 13-hour period of time and then cooled in ambient air to room temperature. Upon cooling to room temperature the green wheel was given a firing cycle in accordance with the conditions described.

| Grinding Wheel Examples 1 to 4 Formulation | |
|---|---|
| Abrasive Grain | 100.0 |
| Bond A | 8.3 |
| 3029 UF Resin | 1.9 |
| Dextrine | 2.0 |
| Starch | 0.3 |
| Ethylene glycol | 0.1 |

| Wheel Example No. | A.G. No. | Abrasive Grain Composition (% by weight) and Density (g/cc) | | | | |
|---|---|---|---|---|---|---|
| | | $Al_2O_3$ | $La_2O_3$ | MgO | NiO | Density |
| 1 | 1 | 96.00 | 2.67 | 1.33 | — | 3.84 |
| 2 | 2 | 96.00 | 2.67 | 1.33 | — | 3.90 |
| 3 | 3 | 96.00 | 2.67 | 0.955 | 0.375 | 3.90 |
| 4 | 4 | 96.00 | 2.67 | 0.58 | 0.75 | 3.90 |

Grinding wheel firing conditions: Room Temperature to 1149° C. (2100° F.) over 25.5 hours, 1149° C. (2100° F.) soak for 3 hours and ambient cooling to room temperature (about 27.5 hours).

Finished wheel size: 1.92×1.60×0.63 cm (0.756×0.630×0.250 inch) recessed 0.968×0.236 mm (0.381×0.093 inch) in one end (wheel size is stated as diameter×width×bore).

| Grinding Wheels Examples 5 to 10 | |
|---|---|
| Abrasive Grain | 100.0 |
| Bond A | 10.1 |
| 3029 UF Resin | 2.2 |
| Dextrine | 2.0 |
| Starch | 0.3 |
| Ethylene glycol | 0.1 |

| Wheel Example No. | A.G. No. | Abrasive Grain Composition (% by weight) and Density (g/cc) | | | | | |
|---|---|---|---|---|---|---|---|
| | | $Al_2O_3$ | MgO | $Y_2O_3$ | $Nd_2O_3$ | $La_2O_3$ | Density |
| 5 | 5 | 96.97 | 0.75 | 0.64 | 0.80 | 0.84 | 3.84 |
| 6 | 6 | 95.78 | 1.12 | 1.13 | 1.13 | 0.84 | 3.90 |
| 7 | 7 | 94.60 | 2.80 | — | — | 2.60 | 3.91 |
| 8 | 8 | 95.90 | 1.30 | — | — | 2.80 | 3.84 |
| 9 | 9 | 94.00 | 3.00 | — | — | 3.00 | 3.88 |
| 10 | 10 | 92.80 | 4.30 | — | — | 2.90 | 3.90 |

Grinding wheel firing conditions: Same as for Examples 1 to 4.

Finished wheel size: 35.6×1.3×12.7 cm (14×0.5×5 inches)

| Grinding Wheels Examples 11 to 13 and Control AA Formulation | |
|---|---|
| Abrasive Grain | 100.0 |
| Bond A | 10.1 |
| 3029 UF Resin | 2.2 |
| Dextrine | 2.0 |
| Starch | 0.3 |

-continued

| | Ethylene glycol | | | 0.1 | | |
|---|---|---|---|---|---|---|
| Wheel | Abrasive Grain Composition (% by weight) and Density (g/cc) | | | | | |
| Example No. | A.G. No. | Al₂O₃ | MgO | Y₂O₃ | Nd₂O₃ | La₂O₃ | Density |

| Wheel Example No. | A.G. No. | Al$_2$O$_3$ | MgO | Y$_2$O$_3$ | Nd$_2$O$_3$ | La$_2$O$_3$ | Density |
|---|---|---|---|---|---|---|---|
| AA | A | 95.47 | 1.58 | 1.05 | 1.07 | 0.83 | 3.79 |
| 11 | 11 | 95.06 | 0.84 | 1.38 | 1.27 | 1.45 | 3.89 |
| 12 | 12 | 94.54 | 1.33 | 1.48 | 1.28 | 1.37 | 3.90 |
| 13 | 13 | 93.42 | 2.40 | 1.55 | 1.28 | 1.35 | 3.94 |

Grinding wheel firing conditions: Same as for Examples 1 to 4

Finished wheel size: 35.6×1.3×12.7 cm (14×0.5×5 inches)

Grinding Wheels Examples 14–16 and Control AAA Formulation

| Abrasive Grain | 100.0 |
|---|---|
| Bond B | 10.2 |
| 3029 UF Resin | 2.0 |
| Dextrine | 2.4 |
| Ethylene glycol | 0.1 |

| Wheel Example No. | A.G. No. | Abrasive Grain Composition (% by weight) and Density (g/cc) |
|---|---|---|
| AAA | A | (see Wheel Example No. AA) |
| 14 | 11 | (see Wheel Example No. 11) |
| 15 | 12 | (see Wheel Example No. 12) |
| 16 | 13 | (see Wheel Example No. 13) |

Grinding wheel firing conditions: Room Temperature to 1232° C. (2250° F.) over 28.5 hours, 1232° C. (2250° F.) soak for 3 hours and ambient cooling to room temperature (about 29.5 hours).

Finished wheel size: 35.6×1.3×12.7 cm (14 ×0.5×5 inches).

Grinding Test Numbers 1–11

Grinding Wheels Examples 1 to 4 were tested for grinding performance in accordance with the following procedure and conditions.

The grinding wheels were trued and used in the internal plunge grinding of a 52100 steel ring shaped workpiece having a Rockwell C hardness of 60 to 62. The ring had a nominal external diameter of 7.6 cm (3 inches), a nominal thickness of 0.95 cm (0.375 inch) and an internal diameter of from 3.0 to 3.2 cm (1.2 to 1.275 inch) and was rotated at a speed of 45.7 surface m (150 surface feet) per minute, based upon the internal bore of the ring, during grinding. A wheel speed of 41009 RPM was employed along with CIMPERIAL HD-90 aqueous based grinding fluid. CIMPERIAL is a registered trademark of Cincinnati Milacron Inc. Two tests were conducted with each wheel at each specific metal removal rate (Q') and the average value of the tests for each wheel are reported in the Test Results. Specific metal removal rate is defined as the volume of material removed per unit time at a unit length of wheel contact with the workpiece, i.e., specific metal removal rate is expressed as volume/(unit time)(unit length), for example, cubic inches per minute-inch. Specific metal removal rates in the Test Results are given as cubic inches per minute-inch. A G-ratio (volume of metal removed per unit volume of wheel lost during grinding) was calculated from measured values of metal weight removed and wheel diameter lost.

| | TEST RESULTS | | |
|---|---|---|---|
| Grinding Wheel Test No. | Grinding Wheel Example No. | Q' | G-ratio |
| 1 | 1 | 0.15 | 387 |
| 2 | 1 | 0.20 | 386 |
| 3 | 2 | 0.10 | 634 |
| 4 | 2 | 0.15 | 682 |
| 5 | 2 | 0.20 | 683 |
| 6 | 3 | 0.10 | 765 |
| 7 | 3 | 0.15 | 617 |
| 8 | 3 | 0.20 | 788 |
| 9 | 4 | 0.10 | 693 |
| 10 | 4 | 0.15 | 728 |
| 11 | 4 | 0.20 | 674 |

Q' = specific metal removal rate

Grinding Wheel Test Numbers 12 to 41

Grinding Wheel Examples 5 to 13 and Control AA were tested for grinding performance in accordance with the following procedure and conditions.

The grinding wheels were mounted on a Universal Center type grinder and plunge grinding performed on a 10×0.51×3.18 cm (4×0.20×1.25 inch) 4145 steel cylindrical workpiece having a Rockwell C hardness of 52–54 rotating at 60.96 surface m, (200 surface feet) per minute, using a wheel speed of 1718 RPM and specific metal removal rates (Q') of 0.40, 0.60 and 0.80 in separate tests. CIMSTAR ™ 40 metalworking fluid was used during the grinding (CIMSTAR is a registered trademark of Cincinnati Milacron Inc.). Each test was conducted to remove 1.270 cm (0.500 inch) from the diameter of the workpiece and measurements made of metal removed and wheel wear for computing G-ratio values.

| | TEST RESULTS | | |
|---|---|---|---|
| Grinding Wheel Test No. | Grinding Wheel Example No. | Q' | G-ratio |
| 12 | 5 | 0.40 | 43.92 |
| 13 | 5 | 0.60 | 34.76 |
| 14 | 5 | 0.80 | 24.51 |
| 15 | 6 | 0.40 | 154.61 |
| 16 | 6 | 0.60 | 150.87 |
| 17 | 6 | 0.80 | 122.92 |
| 18 | 7 | 0.40 | 151.39 |
| 19 | 7 | 0.60 | 144.18 |
| 20 | 7 | 0.80 | 108.55 |
| 21 | 8 | 0.40 | 83.11 |
| 22 | 8 | 0.60 | 75.26 |
| 23 | 8 | 0.80 | 58.65 |
| 24 | 9 | 0.40 | 123.78 |
| 25 | 9 | 0.60 | 114.04 |
| 26 | 9 | 0.80 | 100.25 |
| 27 | 10 | 0.40 | 113.59 |
| 28 | 10 | 0.60 | 100.18 |
| 29 | 10 | 0.80 | 93.25 |
| 30 | AA | 0.40 | 68.85 |
| 31 | AA | 0.60 | 51.19 |
| 32 | AA | 0.80 | 32.26 |
| 33 | 11 | 0.40 | 71.39 |
| 34 | 11 | 0.60 | 56.79 |
| 35 | 11 | 0.80 | 43.42 |
| 36 | 12 | 0.40 | 121.17 |
| 37 | 12 | 0.60 | 89.18 |
| 38 | 12 | 0.80 | 72.18 |
| 39 | 13 | 0.40 | 133.03 |
| 40 | 13 | 0.60 | 136.45 |
| 41 | 13 | 0.80 | 112.37 |

Grinding Wheel Test Numbers 42–49

The grinding wheels of Examples 14 to 16 and AAA were tested for grinding performance in accordance with the following procedure and conditions.

The same test procedure was used as in Test Numbers 12 to 41 except that specific metal removal rates of 0.20 inch and 0.40 inch respectively were used. Metal removal rates in the Results table are given as cubic inches per minute-inch.

| Grinding Wheel Test No. | Results Grinding Wheel Example No. | Q' | G-ratio |
|---|---|---|---|
| 42 | AAA | 0.20 | <1 |
| 43 | AAA | 0.40 | <1 |
| 44 | 14 | 0.20 | 8.35 |
| 45 | 14 | 0.40 | 3.43 |
| 46 | 15 | 0.20 | 12.31 |
| 45 | 15 | 0.40 | 4.84 |
| 48 | 16 | 0.20 | 44.78 |
| 49 | 16 | 0.40 | 38.23 |

This invention has been described with respect to various embodiments and practices thereof. Other embodiments and practice of this invention as shall be readily recognized from this disclosure by those skilled in the art are intended to be embraced by the intent and scope of the following claims.

What is claimed is:

1. A vitreous bonded abrasive article having enhanced G-ratio grinding performance comprising (a) high density sol-gel alumina-based abrasive grain comprised of alpha alumina and modifier, and (b) a vitreous bond phase binding together the abrasive grains, wherein said high density sol-gel alumina-based abrasive grain comprises by weight on an oxide basis, 88 to 99 parts alumina, 0.01 to 6 parts magnesia, 0.01 to 10 parts yttria, 0.01 to 6 parts lanthanum oxide and 0.01 to 6 parts neodymium oxide, wherein the minimum combined amount of yttria, lanthanum oxide, and neodymium oxide is at least 0.1 part.

2. A vitreous bonded abrasive article having enhanced G-ratio grinding performance comprising (a) high density sol-gel alumina-based abrasive grain comprised of alpha alumina and modifier, and (b) a vitreous bond phase binding together the abrasive grains wherein said sol-gel alumina-based abrasive grain comprises on a weight basis based on 100 parts of abrasive grain:
   (a) 0.1 to 10 parts modifier selected from the group consisting of
      (i) magnesia,
      (ii) nickel oxide,
      (iii) zinc oxide,
      (iv) cobalt oxide,
      (v) iron oxide,
      (vi) titania,
      (vii) mixtures of (i)–(vi);
   (b) 0 to 10 parts yttria;
   (c) 0 to 10 parts modifier comprised of an oxide of rare earth metal selected from the group consisting of
      (i) praseodymium,
      (ii) samarium,
      (iii) ytterbium,
      (iv) neodymium,
      (v) lanthanum,
      (vi) gadolinium,
      (vii) cerium,
      (viii) dysprosium,
      (ix) erbium, and
      (x) mixtures of (i)–(ix);
   (d) the balance of the 100 parts is alumina, and provided the minimum amount of (b), (c) or a combination of (b) and (c) is at least 0.1 part.

3. The vitreous bonded abrasive article according to claim 2 wherein the sol-gel alumina-based abrasive grain has a density of at least 3.86 grams per cubic centimeter.

4. The vitreous bonded abrasive article according to claim 2 wherein the sol-gel alumina-based abrasive grain has a density of at least 3.89 grams per cubic centimeter.

5. The vitreous bonded abrasive article according to claim 2 wherein the high density sol-gel alumina-based abrasive grain has been made by an impregnation process.

6. The vitreous, bonded abrasive article according to claim 2 wherein the high density sol-gel alumina-based abrasive grain is non-seeded.

7. The vitreous bonded abrasive article according to claim 2 also including other abrasive grain which is not high density sol-gel alumina-based abrasive grain.

8. The vitreous bonded abrasive article according the claim 2 wherein said article is a grinding wheel.

9. The vitreous bonded abrasive article according to claim 2 wherein the modifier comprises an oxide of magnesium and of lanthanum.

10. The vitreous bonded abrasive article according to claim 7 wherein said other abrasive grain is selected from the group consisting of fused alumina, silicon carbide, cubic boron nitride and diamond abrasive grain.

11. A vitreous bonded abrasive article having enhanced G-ratio grinding performance, comprising abrasive grains and a vitreous bond phase binding together said grains wherein the abrasive grains comprise at least sol-gel alumina-based abrasive grains comprising alumina and at least 0.01% by weight of said alumina-based abrasive grain of a modifier selected from the group consisting of 1) oxides of zirconium, hafnium, cobalt, titanium, nickel, iron, zinc, magnesium, yttrium, praseodymium, samarium, ytterbium, neodymium, lanthanum, gadolinium, cerium, dysprosium, erbium and combinations thereof, and 2) a product of the reaction between alumina and at least one of said oxides, said sol-gel alumina abrasive having a density of at least 3.85 grams per cubic centimeter.

12. A vitreous bonded abrasive article having enhanced G-ratio grinding performance comprising (a) high density sol-gel alumina-based abrasive grain comprised of alpha alumina and modifier, and (b) a vitreous bond phase binding together the abrasive grains, wherein said high density sol-gel alumina-based abrasive grain comprises by weight on an oxide basis, 91 to 99 parts alumina, 0.1 to 3 parts magnesia, 0.1 to 3 parts lanthanum oxide, and 0.1 to 3 parts neodymium oxide.

* * * * *

UNITED STATES PATENT AND TRADEMARK OFFICE
CERTIFICATE OF CORRECTION

PATENT NO. : 5,282,875  
DATED : February 1, 1994  
INVENTOR(S) : Wood et al.

Page 1 of 1

It is certified that error appears in the above-identified patent and that said Letters Patent is hereby corrected as shown below:

Column 3,
Line 67, "Vitreous" should be -- vitreous --.

Column 6,
Line 65, "U.S. Pat Nos. 518,397;" should be -- U.S. Pat. Nos. 4,518,397; --.

Column 9,
Line 51, "$SiO_2$ 63 28" should be -- $SiO_2$ 63.28 --.

Column 11,
Line 23, "General procedure" should be -- General Procedure --.
Line 52, "$Al_2O_3$ 7.55" should be -- $Al_2O_3$ 17.55 --.

Column 16,
Line 25, "vitreous, bonded" should be -- vitreous bonded --.

Signed and Sealed this

Twenty-third Day of April, 2002

Attest:

JAMES E. ROGAN  
*Director of the United States Patent and Trademark Office*

*Attesting Officer*